April 28, 1942.    D. A. SWANSON    2,280,936
CONVERTIBLE TANDEM BICYCLE
Filed Aug. 6, 1940
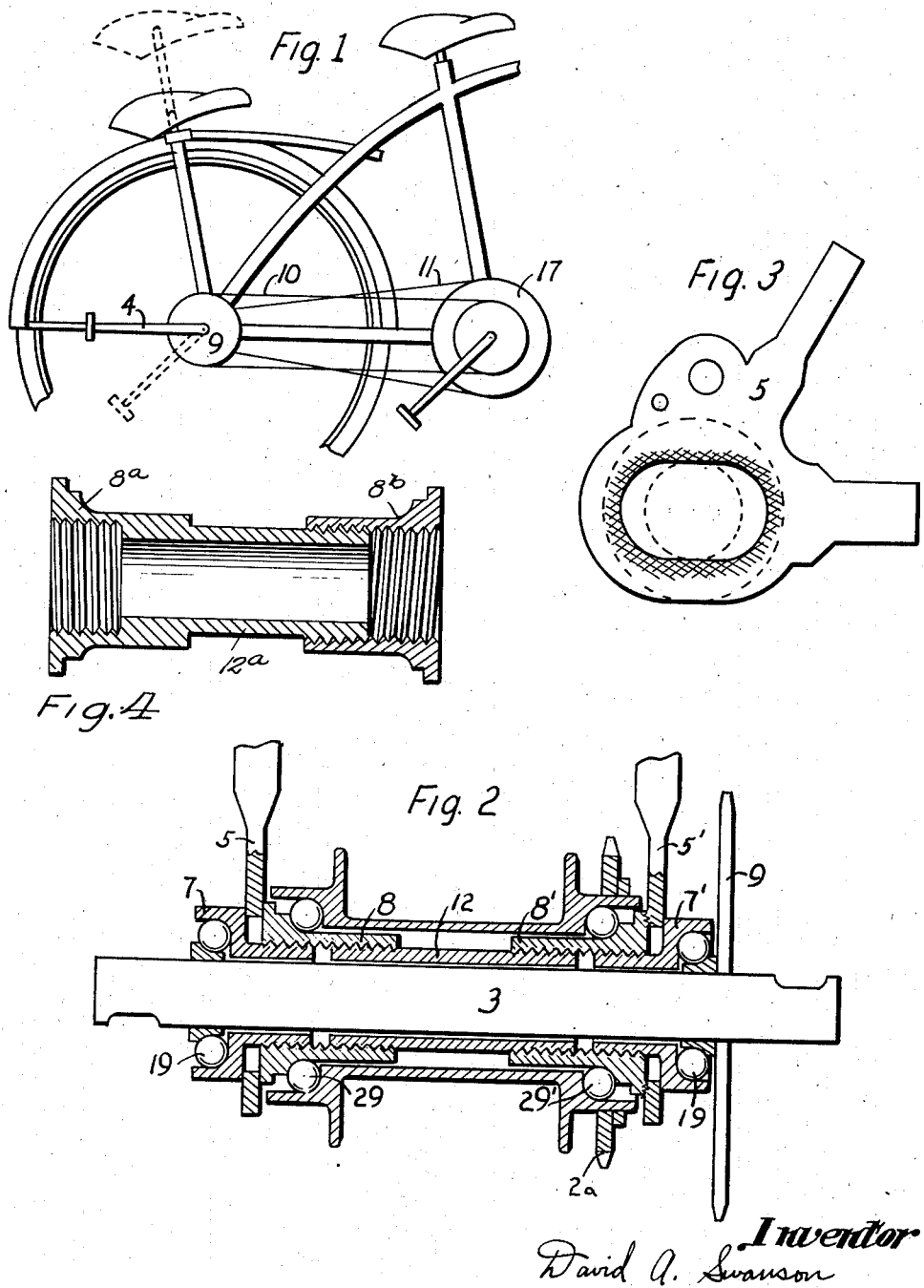
Inventor
David A. Swanson Patented Apr. 28, 1942

2,280,936

UNITED STATES PATENT OFFICE 2,280,936

CONVERTIBLE TANDEM BICYCLE

David A. Swanson, Chicago, Ill.

Application August 6, 1940, Serial No. 351,588

7 Claims. (Cl. 301—2.5)

The invention relates to improvements in convertible tandem bicycles of the type which have the tandem drive mounted in the rear wheel center. The main object is to provide a rear axle which will serve as a rigid and practical mounting for both the rear wheel hub and the rear crank shaft.

A second object of the invention is to construct a rear axle which will allow the use of large bearings for both the rear hub and the rear crank shaft without increasing the size of the rear hub or its attached sprocket, since an increase in the number of teeth on the rear sprocket would prevent proper gear ratio between the front and rear sprockets.

A third object is to provide a more efficient method of mounting the rear axle to the frame so as to facilitate chain adjustment and wheel removal.

A fourth object is to provide a rear fork end of simple design which will allow for chain adjustment and easy wheel removal, and yet which has the necessary strength for tandem use.

A still further object is to construct the rear axle, the mounting, and the bearing supports along lines of simplicity and efficiency.

With the above objects in view and any others which may suggest themselves from the description to follow, a better understanding of the invention may be had by reference to the accompanying drawing in which:

Fig. 1 is an elevation of the rear portion of the bicycle with dotted lines indicating the position of the rear seat and pedal cranks when the bicycle is to be used for two riders.

Fig. 2 is a horizontal section in full scale of the rear wheel axle assembly, including the rear wheel hub and rear crank shaft.

Fig. 3 is an elevation in full scale of the rear fork end.

Figure 4 is a longitudinal sectional view of a modified construction of the crank shaft bearing support.

Referring specifically to Fig. 1 it will be seen that the power which the rear rider applies to pedal cranks 4 is transmitted through chain 10 to the main front gear 17 where it is augmented by the power applied to the front cranks and then transmitted back in the usual manner to the rear hub sprocket 2a (Fig. 2) by means of chain 11.

In previous applications I have made claims for improvements in the tandem drive and rear seat mounting for this type of bicycle (249,087 and 346,165).

In Fig. 2 the improved axle and mounting which is the main object of the present invention is shown in shaded sections 8, 8' and 12. The rear fork ends 5, 5' have a closed slot (Fig. 3) within which the axle may be fixed for proper chain adjustment. The usual fork ends with open slots, may, of course, be employed. Rear pedal crank shaft 3 is of the three piece type having detachable pedal cranks to one of which is fixed the tandem driving gear 9. Other types of pedal cranks may be used.

The crankshaft bearing supports 7, 7' are separate units of the rear axle proper. They have threaded ends which extend through the rear fork end slots (Fig. 3) and screw into the abutments of the axle. The abutments 8, 8' may be adjustable for bearing clearance, by threading them to the central portion of the axle, and it should be noted that the abutments have surfaces positioned outwardly of respective ends of the hub. The surfaces of these abutments are roughened as are the inner surfaces of the rear fork ends 5, 5' so that when bearing support members 7, 7' are tightened, the rear axle is fixed securely in the slot.

In Figure 4, there is illustrated a modified form of the crank shaft bearing support in which the abutment 8—a is formed integral with the members 12—a, and the abutment 8—b is adjustably mounted therein, as previously described.

In previous bicycles of the convertible tandem type employing a tubular axle or sleeve, the tubular axle or sleeve was either fixed rigidly in the rear fork ends with no provision for chain adjustment or easy wheel removal, or if provision was made for chain adjustment and wheel removal, the tubular axle was made to extend into or through one or both fork ends and was fixed to the fork ends by means of ring nuts or more complicated devices. This method of extending a tubular axle into or through the rear fork ends has several disadvantages, among which are: 1. The rear hub, in order to accommodate two pairs of average size bearings, one within the other, (one pair for the hub and one pair for the crank shaft) must be made unusually large in diameter. This increased diameter makes it impossible to employ a sprocket on the rear hub with a small enough number of teeth to maintain proper gear ratios with the front driving sprocket. It is also difficult to construct a free-wheeling unit on a hub of unusual diameter. 2. The size of all bearings and bearing supports must be reduced in size in order to retain a rear hub sprocket of normal size. In view of the extra heavy load on bearings imposed by a tandem rider, this limitation of bearing surface is a serious disadvantage. 3. The slots in the fork ends must be made unusually wide in order to accommodate the tubular axle within which is journalled the crankshaft, and they must be open at one end to provide for wheel removal, thus weakening the fork end and complicating its construction. 4. Ring nuts or other fastening devices cannot securely fasten an axle of this large size to the frame without unduly complicating the structure, adding to the weight of the machine, and increasing the cost of construction.

It will be seen in Figs. 2 and 3 that the present invention avoids these difficulties. The crankshaft bearings 19, 19', in place of being mounted in the tubular axle itself, are mounted in separate supports 7, 7' which have threaded sections extending through the fork end slots and engaging with threaded sections of the axle proper. The diameter of the ball races in supports 7, 7' is thus considerably larger than the width of the slot in the rear fork end. In this manner, bearings 19, 19' may be made large enough for efficient operation without increasing the size of the axle proper, the rear hub and attached sprocket, or the width of the fork end slot.

The axle is more simply and securely fastened to the frame since no separate ring nuts or other fastening devices are needed. Supports 7, 7' serve both to mount the shaft bearings and to clamp the axle securely to the fork ends.

Easy wheel removal is provided for since the bearing supports 7, 7' may be unscrewed from the axle, allowing the rear wheel to be dropped from the frame.

Although some previous bicycles of the convertible tandem type employ bearing supports mounted externally of the fork ends, these supports are fixed to the fork ends themselves, and there is no tubular axle adjustably fixed between the fork ends so as to provide a rigid spacer between the fork members.

Thus it will be seen that some of these previous bicycles have the advantages of crankshaft bearing supports mounted externally of the fork ends, other bicycles have the advantage of a rigid, tubular spacer between the fork ends, and still others have the advantages of a tubular axle which is adjustably fixed for chain take-up, but no invention was provided which combined in a practical manner all three of these features. Yet it is upon the efficient operation of this rear axle assembly that the success of the convertible tandem bicycle depends.

The combination of crankshaft bearing support members mounted externally of the fork ends, having threaded portions extending through the fork end slots, and being adjustably fixed within a tubular axle or sleeve so as to provide a rigid spacer between the fork ends, is original and has the distinct advantages described above.

While I have described the invention along specific lines, various minor changes and refinements may be made without departing from its principle, and I desire to consider all such changes and refinements as coming within the scope of the appended claims.

I claim:

1. A rear axle for tandem bicycles comprising a hub, a tubular section within the hub and having a radial abutment member at the ends, each abutment member having a surface positioned beyond the ends of the hub, respective fork ends abutting said surfaces, a tubular bearing support adjustably engaged in each abutment member for clamping action against respective fork ends, each bearing support having a bearing assembly outwardly of the fork ends, and a crank shaft journalled in and projecting beyond said bearing assemblies.

2. The structure of claim 1, in which one of the abutment members is longitudinally adjustable upon the tubular section.

3. The structure of claim 1 in which the outermost surfaces of the abutment members are roughened and complemental to similar surfaces of the adjacent face of the fork ends.

4. A rear axle for tandem bicycles comprising in combination with a hub having ball raceways at its ends, a tubular axle within the hub, an abutment member on each end of the axle constructed for maintaining a ball bearing assembly within the raceway of the hub, said abutment members being longitudinally adjustable upon the axle, a bearing support longitudinally adjustable within each abutment member, the bearing supports being constructed to receive respective fork ends next adjacent the abutment members, said bearing supports having an axial opening aligned with the tubular axle, and a crank shaft journalled in said tubular axle and said bearing supports.

5. A rear axle for tandem bicycles comprising a hub, a tubular section within the hub of a length stopping inwardly of the ends thereof, an abutment member threadedly engaged with the ends of the tubular section, each abutment having a surface positioned beyond the ends of the hub, ball bearing assemblies between the hub and the abutment members, respective fork ends abutting the outermost surface of the abutment members, a tubular bearing support threadedly engaged in each abutment member for clamping action against respective fork ends, each bearing support having a bearing assembly outwardly of the fork ends, and a crank shaft journalled in and projecting beyond said bearing assemblies.

6. The structure of claim 4 in which the outermost surface of the abutment members are roughened and complemental to similar surfaces of the adjacent face of the fork ends.

7. A rear axle for tandem bicycles comprising in combination with a hub, having ball raceways at its ends, a tubular axle within the hub, an abutment member on each end of the axle constructed for maintaining a ball bearing assembly within the raceway of the hub, one of said abutment members being longitudinally adjustable upon the axle, a bearing support longitudinally adjustable within each abutment member, the bearing supports being constructed to receive respective fork ends next adjacent the abutment members, said bearing supports having an axial opening aligned with the tubular axle, and a crank shaft journalled in said tubular axle, and said bearing supports.

DAVID A. SWANSON.